Dec. 2, 1969   R. G. KNUTSON   3,481,207
RATE GYRO POSITION FOLLOW-UP
Filed Jan. 9, 1967   2 Sheets-Sheet 1

INVENTOR.
ROY G. KNUTSON
BY
ATTORNEY

Dec. 2, 1969   R. G. KNUTSON   3,481,207
RATE GYRO POSITION FOLLOW-UP
Filed Jan. 9, 1967   2 Sheets-Sheet 2

INVENTOR.
ROY G. KNUTSON
BY
ATTORNEY

United States Patent Office 3,481,207
Patented Dec. 2, 1969

3,481,207
RATE GYRO POSITION FOLLOW-UP
Roy G. Knutson, 2504 University Drive,
Newport Beach, Calif. 92660
Filed Jan. 9, 1967, Ser. No. 608,144
Int. Cl. G05g 19/28
U.S. Cl. 74—5.6      4 Claims

ABSTRACT OF THE DISCLOSURE

In order that the ailerons or other control elements of light aircraft might be directly controlled from a rate gyro, the main shaft of the gyro is formed with a disk thereon, and this disk drives a wheel directly, due to the principle of the drive wheel being deflected vertically when the point of engagement of the drive wheel and the driving head becomes eccentric to the center line of the driving head. With this construction I eliminate elaborate drive couplings between the rate gyro and the control surface of the aircraft.

---

A rate gyro position follow-up which can be adapted to the aileron control system on light aircraft, and where the output of the gyro is directly coupled to the aileron control systems. A mechanical deflection is obtained which is proportional to the angular displacement of a single degree of freedom gyro about its output axis. This deflection is obtained without imposing a load on the output axis. The linearity of the output angular displacement with the input angular rate is preserved; that is, if the gyro is a spring restrained or so-called rate gyro. The mechanical deflection produced in the gyro is used to drive a substantial load. Also alternately, if the gyro is restrained largely by viscous damping (a so-called integrating rate gyro) the angular displacement of the gyro about its output axis is always linear with the input angular displacement regardless of the magnitude of the load driven by the mechanically derived deflection. Therefore, this rate gyro position follow-up has the advantage that the output angular displacement of a single degree of freedom gyro can be utilized to drive an external load, such as an indicator dial or the control system of an airplane without producing adverse torque about the gyro output gimbal.

This invention is an improvement on my prior Patent No. 2,709,922, June 7, 1955, for a "Mechanically Integrating Rate Gyro."

An object of my invention is to provide an improved gyro, particularly of the single degree of freedom type, and where the mechanical deflection of the gyro can be utilized to drive an external load.

Another object of my invention is to provide a novel rate gyro of the character stated in which the displacement of the gyro is utilized to activate a mechanism external to the gyro, and which will not produce adverse torques of the gyro about the output gimbal.

Another object of my invention is to provide a novel rate gyro of the character stated readily adjustable and easily maintained, which is relatively economical to manufacture, which is compact, and which eliminates a caging or uncaging apparatus, is non-tumbling and obviates nutation problems.

Other objects, advantages and features of invention may appear from the accompanying drawings, the subjoined detailed description and the appended claims.

Figure 1:
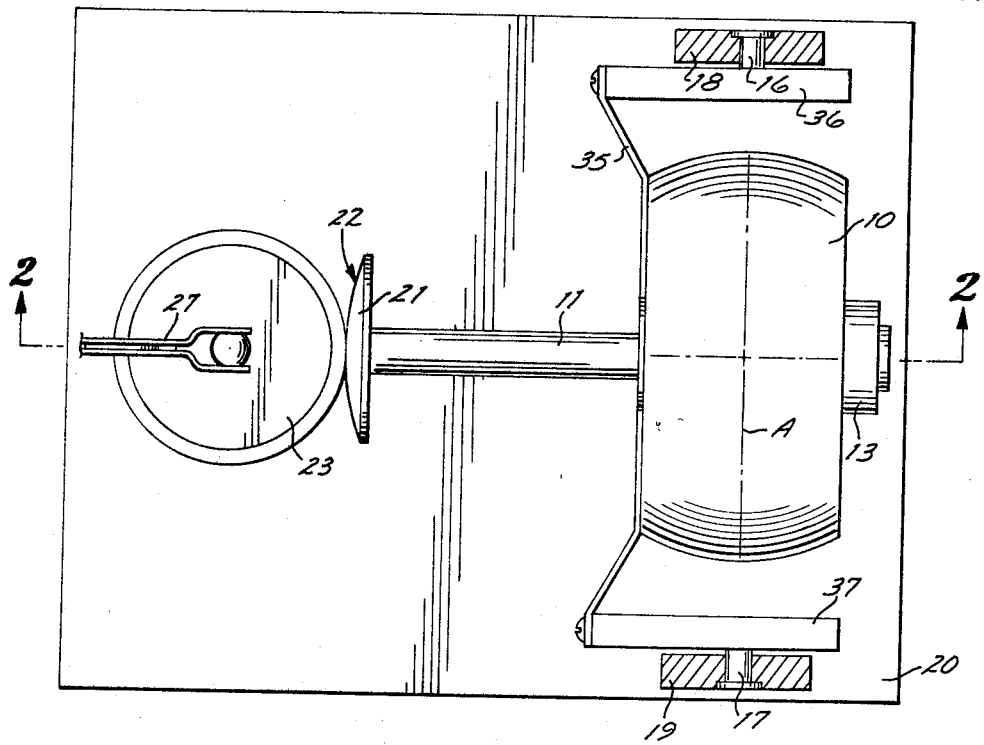
FIGURE 1 is a top plan view of my rate gyro position follow-up.

Referring more particularly to the drawing, the invention comprises a gimbal 10 which is formed as an electric motor housing, and which rotatably supports a shaft 11. The shaft 11 is journaled in bearings 12 and 13 and is driven by an attached electric motor armature 14 forming a gyro rotor which is rotated by a suitably energizable electric field.

The gimbal is provided with aligned and oppositely projecting pintles 16 and 17 journaled for rotation about the gimbal axis A. The pintles 16–17 are journaled in a pair of pillow blocks or supports 18–19 respectively, and these pillow blocks are supported on a base 20 which is mounted on the vehicle, such as an aircraft or the like. The pillow blocks 18–19 can be either fixedly attached to the base 20 under some conditions, or the blocks may be slidably mounted and spring pressed, as will be subsequently described.

A driving head 21 is affixed to the outer end of the shaft 11 for rotation with this shaft, and is provided with a convex spherical surface 22. All points on the surface 22 are the same distance from the intersection of the gimbal axis A and the rotor axis B, substantially as shown. The member or head 21 forms the driving wheel of a friction wheel drive system. It will thus be evident that the drive member 21 moves in a plane perpendicular to the gimbal axis, as gimbal axis A, as the gyro rotates about that axis.

A friction disk 23 contacts the drive wheel 21 at rightangles, so that as the gyro rotates about the gimbal axis A in response to an externally produced rotation about the gyro sensitive or input axis C the friction wheel 23 will turn at a rate proportional to the gimbal rotation.

The driven wheel 23 frictionally engages the surface 22 and this wheel is affixed to the shaft 24 which is threaded into the block 25 mounted on the base 20. The threads 26 on the shaft 24 screw into the block 25, and on rotation of the shaft 24 this shaft and the friction wheel 23 will move vertically relative to the drive wheel 21. This movement is shown in dotted lines in FIGURE 3.

Figure 2:
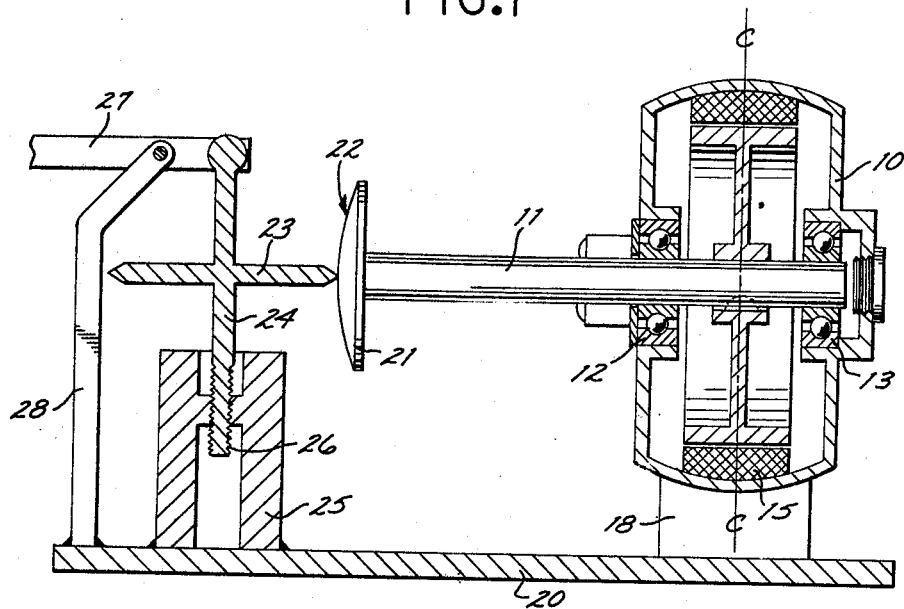
FIGURE 2 is a vertical sectional view taken on line 2—2 of FIGURE 1.
Figure 3:
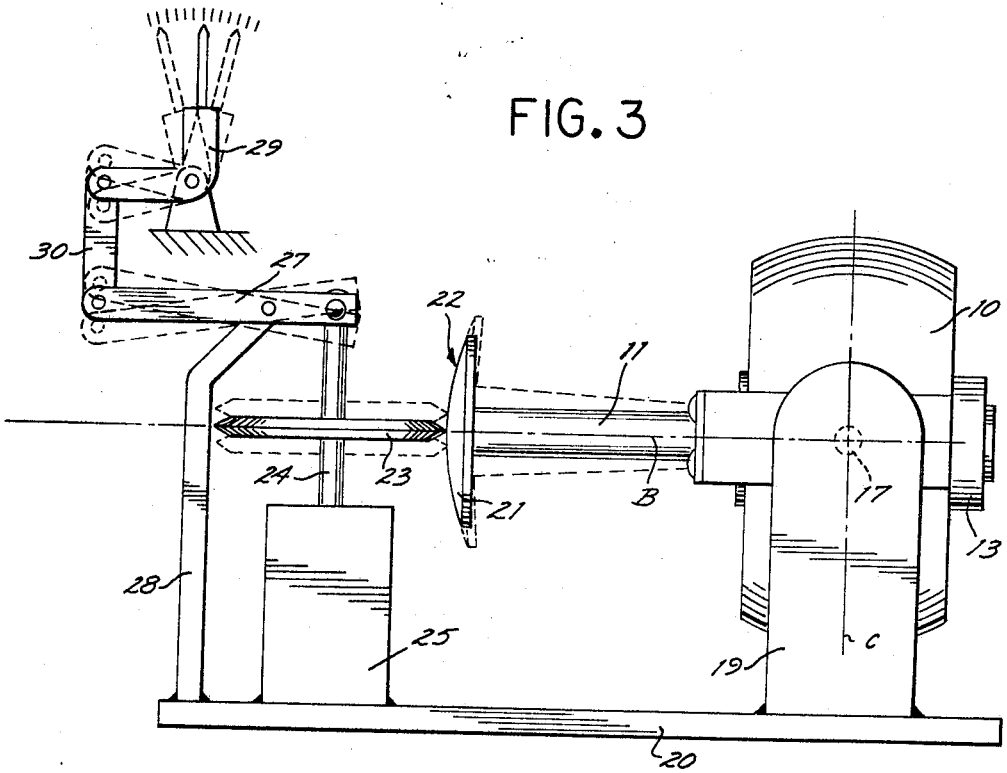
FIGURE 3 is a side elevation of my rate gyro illustrating one type of external load.

In the mechanical take-off, as shown in FIGURES 1, 2 and 3, the shaft 24 is pivotally attached to one end of a link 27 which is pivotally mounted on a bracket 28. The arm 27 is also pivotally connected to the bell crank sleeve 29 by the coupling 30, and the bell crank 29 can perform useful work such as an indicator, electrical contacts, the control system of an airplane, etc.

Figure 4:
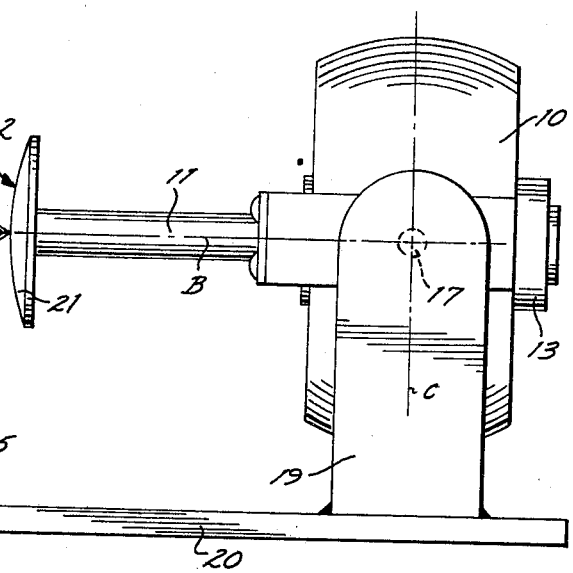
FIGURE 4 is a side elevation of a rate gyro according to my invention and showing still another type of external load.

As shown in FIGURE 4, the shaft 24 can perform useful work by another type of pick-off, such as a drum 31 attached to the shaft 24 and an endless belt 32 which encircles the drum 31 and a pulley 33 on a shaft 34. Thus the shaft 34 will be rotated as the shaft 24 rotates.

To maintain frictional driving contact between the head 21 and the driving disk 23, one of these members may be spring loaded in the manner shown in my Patent No. 2,709,922, or the blocks 18, 19 or 25 may be spring loaded and slidably mounted on the base 20, or the construction shown in FIGURE 1 may be utilized where a flat pre-loaded spring 35 is mounted on the housing 10 and is attached to suitable supports 36 and 37. This spring support 35 is deflected slightly to establish a pre-load engaging surface 22 and the wheel 23. Since the friction wheel 23 is always in contact with the surface 22, it will be evident that the friction wheel will follow up on the driving head 21, since it will continue to turn until it is positioned at the center of the friction drive surface 22. The axial displacement of the friction wheel 23 from the neutral position will then be exactly equal to the linear displacement of the center of the domed surface 22.

Referring to FIGURE 3, if the dome linear displacement is denoted $x$, at a distance $r$ from the gimbal axis, then $x/r=\theta$ radians, the gyro output angular displacement to a close approximation if $\theta$ is small. Thus the friction wheel axial deflection $x'$ is also equal to $r\theta$ and so is proportional to the gyro output displacement angle. If the gyro is spring restrained about the gimbal axis, $\theta = K\dot{\beta}$, where $\dot{\beta}$ is the rate of rotation with respect to inertial space of the gyro about its input axis. Then the friction wheel axial deflection is $X'=rK\dot{\beta}$.

From the above equation it is apparent that a mechanical deflection X' has been produced which is linearly related to the input rate of turning about the gyro sensitive axis. Furthermore, this deflection is obtained without direct connection to the gyro gimbal and, consequently, no load is applied to the gimbal even though the axial movement of the friction wheel may be used to drive a considerable load.

Theoretically, the external load driven by the deflection X' is reflected back through the screw thread to the friction drive between the friction wheel and the friction dome. Practically, it seems desirable that the screw thread have as fine a pitch as possible which will prevent reflection of the load back to the friction drive because of the well known irreversibility of low pitch screw systems. However, the friction drive must overcome the screw friction responsible for the irreversiblity without slipping itself. The screw friction will be some function of the external load, but proper design can make the torque for incipient slippage of the friction drive sufficiently greater than the screw friction torque to insure proper operation.

For the case in which the gyro gimbal is restrained only by viscous damping $\theta = \int K_2\dot{\beta} = K_2\beta + \text{constant}$. Assuming initial conditions are known $\theta = K_2\beta$; $X' = rK_2\beta$. From this it is seen that the output deflection can be made proportional to the input angular displacement of the gyro in inertial space if a single degree of freedom gyro of the so-called integrating rate type is employed.

It should be noted that although the operation of this invention has been described in terms of the axial displacement X' of the friction wheel, an entirely equivalent deflection, that of rotation of the friction wheel, also takes place. Depending on the application which is intended, one or the other or both these deflections can be utilized and both forms are a basic embodiment of the invention.

IN OPERATION

The invention so far described it will be assumed that the base 20 is affixed to a vehicle movable in three dimensions, and which is moving along a desired course in a horizontal direction. The geometric center of the surface 22 which has zero radius now contacts the wheel 23. Consequently, the wheel 23 remains stationary. Assuming now that the vehicle changes its azimuth course by rotating about the sensitive axis C of the gyro, this being an axis which is perpendicular to axis B. This produces a torque on the gyro gimbal which rotates it about axis A either clockwise or counterclockwise, depending upon the direction of the rotor. Similarly, if the vehicle changes its course by rotating counterclockwise about the sensitive axis, the gimbal rotates about the axis A in a direction opposite to the direction just referred to. When the gimbal rotates as just described, the member 21 moves to a position wherein a finite radius on surface 22 contacts the wheel 23 as illustrated by dotted lines in FIGURE 3, thus rotating the wheel 23 at a rate proportional to the magnitude of the gimbal rotation about axis A. The output motion of the wheel 23 through the rotation of the shaft 24 has been previously described.

Having described my invention, I claim:

1. A rate gyro position follow-up of the single degree of freedom type having a gimbal support adapted to be immovably affixed to a movable vehicle and wherein the gimbal is mounted by the support for freedom of rotation about only one axis, a rotor and rotor shaft carried by the gimbal for conjoint rotation about a rotor axis disposed perpendicular to the gimbal axis, means for rotating the rotor, and resilient means associated with the gimbal for maintaining the rotor axis coincident with a certain reference axis when the vehicle is not turning about the gyro sensitive axis, said resilient means permitting the gimbal to rotate about its axis when the vehicle is turning about the sensitive axis, whereby the rotor axis may move angularly with respect to said reference axis, and for returning the rotor axis to a position coincident with said reference axis after the vehicle has ceased to turn about the sensitive axis, the improvement in combination comprising; a friction wheel driving member affixed to said shaft for rotation therewith having a spherical surface thereon, the geometric center of which is disposed at the intersection of the rotor and gimbal axes, a rotatable member, means operatively connecting the rotatable member with the driving member including at least one friction wheel engaging the driving member for rotating the rotatable member at an angular speed directly proportional to the angle between the rotor axis and said reference axis, and means on said rotatable member to drive the rotatable member vertically relative to the driving member, on displacement of the rotatable member relative to the driving member, and wherein said last named means includes a threaded shaft and a block in which said shaft is threaded.

2. A rate gyro position follow-up as recited in claim 1, and wherein said last named means includes a threaded shaft and a block in which said shaft is threaded, and a mechanical take-off means connected to said shaft.

3. A rate gyro position follow-up as recited in claim 1, and wherein said last named means includes a threaded shaft and a block in which said shaft is threaded, a mechanical take-off means connected to said shaft, a link coupled to said shaft, useful work load means, said shaft, useful work load means, said link being coupled to the work load means to operate the same.

4. A rate gyro position follow-up as recited in claim 1, and wherein said last named means includes a threaded shaft and a block in which said shaft is threaded, and a mechanical take-off means connected to said shaft, a work load shaft and drive means extending from said shaft to the work load shaft.

References Cited

UNITED STATES PATENTS

| | | | |
|---|---|---|---|
| 2,709,922 | 6/1955 | Knutson | 74—5.6 |
| 2,951,377 | 9/1960 | Lahde | 74—5.6 |
| 3,122,937 | 3/1964 | Fillery | 74—5.6 X |

WILLIAM E. WAYNER, Primary Examiner

U.S. Cl. X.R.

244—79